Patented May 18, 1943

2,319,265

UNITED STATES PATENT OFFICE 2,319,265

AZO DYESTUFFS

Swanie S. Rossander, Chiles E. Sparks, and Carl W. Maynard, Jr., Wilmington, Del., assignors to E. I. du Pont de Nemours & Company, Wilmington, Del., a corporation of Delaware No Drawing. Application September 25, 1940, Serial No. 358,296

11 Claims. (Cl. 8—44)

A. The dyeing of textiles is frequently carried out by impregnating the textile throughout with the coupling component of an azo dyestuff and overprinting with a paste containing a diazo salt. By reaction of the diazo salt with the coupling component a colored pattern is produced on the textile. The diazo salts incorporated in the printing paste are of various types, such as diazonium halides, reaction products of the azo component with zinc chloride or other metallic halides, and diazo salts which have been precipitated with aryl sulfonic acids. When incorporated in the printing paste, certain diazo salts deteriorate rapidly, their deterioration being particularly marked by loss in strength of colors made therefrom. Even so short a period of standing as one day has frequently produced so great a change that the paste was no longer useful for its intended purposes.

B. The object of the invention, which has been accomplished by the invention set forth in this patent, was to produce printing pastes which do not deteriorate so swiftly and keep their strength longer. The printing pastes of our invention contain, in addition to the diazo salt and the paste-forming ingredients, an aliphatic carboxylic acid, or a soluble metallic salt thereof. Other objects of the invention and their method of accomplishment will be in part obvious and in part set forth hereinafter.

C. The aliphatic carboxylic acids or the soluble metallic salts thereof which form a constituent of our new printing paste may be mixed with any ingredient of the paste prior to incorporation, or may be mixed with the finished paste. If they are mixed with the diazo component, they can be incorporated therewith prior to or after diazotization. When we refer to primary arylamines, we include not only the amines as such but also the amines in the form of their salts, such as the hydrochloride and the sulfate. Exemplary of the aliphatic carboxylic acids and their soluble salts which have been found by experiment to be effective in this invention are the following: Potassium-acid-maleate is preferred, but excellent results are also obtained with sodium-acid-maleate, di-sodium maleate, sodium crotonate, maleic acid, crotonic acid, malic acid, succinic acid, chloro-acetic acid, trichloro-acetic acid, sorbic acid, glutaric acid, fumaric acid, oxalic acid, glycolic acid, thioglycolic acid, citric acid, acetylene-dicarboxylic acid, citraconic acid, itaconic acid, and adipic acid. It has also been determined that the anhydrides of certain of these acids may also be used effectively as stabilizers, notably the anhydrides of maleic acid and of citraconic acid. The invention is useful when applied to diazo printing pastes containing diazo salts, made from any diazotized primary arylamine, examples of which are diazo salts of the benzene, naphthalene, and anthracene series.

D. The following examples illustrate the invention. In these examples parts are by weight and proportions are illustrative of good practice, not limitations.

Example I

The complex diazo salt from diazotized 2,5-dichloro-aniline and zinc chloride was isolated in the usual manner, dried, and diluted to about 20% strength on an amine basis with maleic acid and inactive diluents such as sodium sulfate in such a manner that the finished dry salt preparation contained 10% maleic acid. A printing paste of the following composition was prepared:

|   | Parts |
|---|---|
| Diazo salt | 4 |
| Water | 30 |
| Starch-gum tragacanth thickener | 66 |
|   | 100 |

This paste was printed from an engraved roller on cotton fibre impregnated with the anilide of 2,3-hydroxy-naphthoic acid. A strong scarlet color was produced. When the same printing paste was used at successive time intervals for printing in the same manner, the persistence in strength of the diazo paste, as judged by the depth of the resulting colors, was far superior to the persistence in strength of a diazo printing paste which was used in a parallel series of printings, but which was made from a similar diazo salt preparation containing no maleic acid. The initial depths of the colors obtained from each of the two pastes were the same, but the paste made from the unstabilized diazo salt lost strength rapidly with accompanying thinning and foaming, while the paste made from the stabilized diazo salt maintained its strength and original physical appearance for much longer periods of time.

Example II

Experiment I was repeated, using crotonic acid in place of maleic acid. Similar marked increases in the stability of the diazo salt printing paste as compared with pastes containing no stabilizer were noted.

E. It was found that each of the other acids or acid anhydrides mentioned above as exemplary of useful aliphatic carboxylic acids produced improved printing paste stability when incorporated in diazo salts.

F. Similar experiments with the stable complex diazo salt from diazotized meta-chloro-aniline and zinc chloride were carried out, and the stabilizers were found to be generally effective in maintaining the strength of the printing pastes. The similar use of a diazo salt prepared from diazotized meta-chloro-aniline and naphthalene-1,5-disulfonic acid also gave attractive results.

G. Additional experiments carried out in a similar manner on the diazo salts prepared from the following bases gave increases in the relative stability of the resultant printing pastes: 4-nitro-2-amino-anisole, 3-nitro-4-amino-anisole, dianisidine, 4-chloro-2-amino-toluene, 4-chloro-2-nitro-aniline, 3-nitro-4-amino-toluene, 5-nitro-2-amino-toluene, 4-chloro-2-amino-anisole, 5-chloro-2-amino-toluene, 1-amino-naphthalene, and 1-amino-anthraquinone.

H. Examples of special base mixtures which are available as starting materials for the preparation of the stable printing pastes are:

*Example III*

| | Parts |
|---|---|
| 5-nitro-2-amino-anisole | 80 |
| Maleic acid | 20 |
| Sodium chloride | 8 |

Ball-milled together.

*Example IV*

| | Parts |
|---|---|
| 3-nitro-4-amino-anisole | 80 |
| Maleic acid | 20 |
| Sodium chloride | 8 |

Ball-milled together.

*Example V*

| | Parts |
|---|---|
| Dianisidine | 80 |
| Maleic acid | 20 |
| Sodium chloride | 8 |

Ball-milled together.

*Example VI*

| | Parts |
|---|---|
| 3-chloro-aniline-hydrochloride | 80 |
| Maleic acid | 20 |
| Sodium chloride | 8 |

Ball-milled together.

*Example VII*

| | Parts |
|---|---|
| 4-nitro-2-amino-anisole-hydrochloride | 80 |
| Maleic acid | 20 |
| Sodium chloride | 8 |

Ball-milled together.

These mixtures may be diazotized either by the usual procedure using a mineral acid, or by substituting an organic acid such as lactic acid, glycolic acid, acetic acid, or butane-sulfonic acid for the usual mineral acid. In all cases, sodium nitrite and the diazotizing acid are added to the mixture. The printing pastes resulting from diazotization of these special bases are definitely superior in stability to those prepared from the normal bases.

I. Base mixtures which require no addition for diazotization except the mixing in of sodium nitrite are a particular feature of our invention. Examples thereof are:

*Example VIII*

7 grams of a dry mixture consisting of 20 grams meta-chloro-aniline hydrochloride, 24 grams glycolic acid, and 3 grams maleic acid was stirred into 37.5 grams water, thickened with 150 grams 2% locust-bean gum, and diazotized by the addition of 5.5 grams 25% sodium nitrite solution. Prints made periodically on cotton fibre padded with the anilide of 2-hydroxy-3-naphthoic acid showed that this printing paste was more stable on standing than a similarly prepared paste containing glycolic acid but no maleic acid.

*Example IX*

7 grams of a dry mixture consisting of 20 grams 3-nitro-4-amino-anisole, 24 grams glycolic acid, and 7 grams maleic acid was stirred into 38 grams water, thickened with 150 grams 2% locust-bean gum, and diazotized by the addition of 5 grams 25% sodium nitrite solution. The stability of the paste on standing was considerably better than that of similar pastes prepared with glycolic acid but containing no maleic acid.

J. The stabilization may be brought about by the use of various amounts of the stabilizing acid in the finished dry diazo salt. We prefer to use amounts of the stabilizer between five and fifteen percent of the finished dry diazo salt. The same result may be obtained by adding the stabilizing acid and the diazo salt separately to the printing paste formula, in which case liquid stabilizers such as dichloro-acetic acid may be used, or by incorporating the stabilizing agent at any stage after the first isolation in the preparation of the diazo salt, or by adding the stabilizing agent to a printing paste prepared by diazotization of the corresponding base. It is not necessary to use the free carboxylic acids, since the water soluble metallic salts such as the alkali metal salts of the acids are equally or even more effective in their stabilizing action, and often present more attractive solubility characteristics.

K. The manner of drying the diazo salt, and the diluents used in the finishing of the diazo salt, have no effect on the new printing pastes, provided, of course, that the diazo salt so prepared is otherwise satisfactory for printing purposes. Many diazo salts in common use do not keep their strength in printing pastes for more than a few hours, while the same diazo salts, in many cases, maintain their printing paste strength for several days when included in the pastes of our invention. The invention is of particular value where large amounts of printing pastes are made up at one time, and used over a comparatively long period.

L. As many apparently widely different embodiments of this invention may be made without departing from the spirit and scope thereof, it is to be understood that we do not limit ourselves to the specific embodiments thereof except as defined in the appended claims.

We claim:

1. A printing paste comprising an aryl diazo salt and one of a group consisting of the aliphatic carboxylic acids and their soluble metallic salts.

2. A printing paste comprising an aryl diazo salt and one of a group consisting of the unsaturated aliphatic carboxylic acids and their water soluble metallic salts.

3. A printing paste comprising an aryl diazo salt metallic halide complex and one of a group consisting of the unsaturated aliphatic carboxylic acids and their water soluble metallic salts.

4. A printing paste comprising an aryl diazo salt and maleic acid.

5. A printing paste comprising an aryl diazo salt and potassium-acid-maleate.

6. A printing paste comprising an aryl diazo salt and crotonic acid.

7. A composition of matter comprising a diazotizable primary arylamine suitable for ice color and printing operations, ingredients of a printing paste, and a diazo salt printing paste stabilizer from a group consisting of the unsaturated aliphatic carboxylic acids and their water soluble metallic salts.

8. A composition of matter comprising a diazotizable primary arylamine suitable for ice color printing operations and a diazo salt stabilizer from the group consisting of the aliphatic carboxylic acids and their water soluble metallic salts.

9. A composition of matter comprising a diazotizable primary arylamine suitable for ice color printing operations and maleic acid.

10. A composition of matter comprising a diazotizable primary arylamine suitable for ice color printing operations and potassium-acid-maleate.

11. A composition of matter comprising a diazotizable primary arylamine suitable for ice color printing operations and crotonic acid.

SWANIE S. ROSSANDER.
CHILES E. SPARKS.
CARL W. MAYNARD, Jr.